United States Patent [19]

Fujikura

[11] Patent Number: 4,725,856

[45] Date of Patent: Feb. 16, 1988

[54] METHOD OF AND APPARATUS FOR CHECKING DEFECTIVELY FUSED AMPOULES

[75] Inventor: Shinichi Fujikura, Kamisato, Japan

[73] Assignee: Eisai Co., Ltd., Tokyo, Japan

[21] Appl. No.: 839,148

[22] Filed: Mar. 12, 1986

[30] Foreign Application Priority Data

Mar. 28, 1985 [JP] Japan .................. 60-064780

[51] Int. Cl.$^4$ ............................. G01N 21/16
[52] U.S. Cl. .................. 250/223 B; 356/240
[58] Field of Search .............. 250/223 B, 224, 560;
356/239, 240, 376, 391, 392, 393; 358/96, 101, 106, 107; 209/524, 525

[56] References Cited

U.S. PATENT DOCUMENTS

| | | | |
|---|---|---|---|
| 4,064,534 | 12/1977 | Chen et al. ........................ | 250/560 |
| 4,454,542 | 6/1984 | Miyazawa ...................... | 250/223 B |
| 4,549,205 | 10/1985 | Misaki ............................. | 356/240 |
| 4,608,709 | 8/1986 | Nedler et al. .................... | 250/223 B |

Primary Examiner—David C. Nelms
Assistant Examiner—Stephone B. Allen
Attorney, Agent, or Firm—Murray and Whisenhunt

[57] ABSTRACT

A method of checking defectively fused ampoules wherein a head portion of a fused ampoule is projected on a light receiving screen so as to focus an image of the heat portion thereon, a focused image is scanned with a plurality of scanning lines running in the diametral direction of the focused image and sequentially sweeping in the longitudinal direction thereof to produce a plurality of edge signals corresponding to the scanning lines, the number of edge segments and the inner and outer widths are measured from each of the edge signals, measured values are compared with predetermined logical references set for the number of edge segments and inner and outer widths, and the fused ampoule is judged defective when the measured values are incongruous to the logical references.

2 Claims, 25 Drawing Figures

| MEASUREMENT POINT / PRODUCT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| R1 | 0.57 | 2.14 | 3.00 | 3.57 | 4.00 | 4.43 | 4.86 | 5.14 | 5.29 | 5.43 | 5.57 | 5.71 | 5.71 | | | |
| R2 | 1.14 | 2.29 | 3.14 | 3.85 | 4.29 | 4.71 | 5.29 | 5.57 | 5.71 | 5.86 | 5.86 | 6.14 | 6.14 | | | |
| R3 | 0.86 | 2.29 | 3.71 | 4.29 | 4.71 | 5.00 | 5.29 | 5.57 | 5.71 | 5.86 | 6.00 | 6.14 | | | | |
| R4 | 0.86 | 2.29 | 3.14 | 3.86 | 4.14 | 4.57 | 5.00 | 5.29 | 5.57 | 5.71 | 6.00 | 6.00 | 6.00 | 6.14 | | |
| R5 | 0.86 | 2.14 | 3.00 | 3.57 | 4.14 | 4.57 | 5.00 | 5.29 | 5.57 | 5.71 | 5.86 | 6.00 | 6.00 | 6.14 | | |
| B11 | 0.86 | 4.00 | 5.00 | 5.57 | 5.71 | 5.86 | 5.93 | 5.93 | 6.00 | | | | | | | |
| B12 | 0.29 | 4.57 | 5.43 | 5.89 | 6.14 | 6.29 | 6.29 | | | | | | | | | |
| B4 | 0.57 | 1.29 | 1.57 | 3.00 | 3.86 | 4.43 | 4.86 | 5.29 | 5.57 | 5.86 | 6.00 | | | | | |
| | 0.29 | 0.71 | 0.86 | 1.86 | 4.00 | 4.43 | 5.14 | 5.43 | 5.71 | 5.86 | 6.00 | | | | | |
| B1 | 0.29 | 1.29 | 1.57 | 2.57 | 2.86 | 3.57 | 4.14 | 4.57 | 5.00 | 5.29 | 5.57 | 5.86 | 6.00 | | | |
| | 0.57 | 1.14 | 1.29 | 1.86 | 2.71 | 3.57 | 4.29 | 4.71 | 5.14 | 5.43 | 5.71 | 5.86 | 6.00 | | | |

METHOD OF AND APPARATUS FOR CHECKING DEFECTIVELY FUSED AMPOULES

FIELD OF THE INVENTION

This invention relates to a method of and an apparatus for checking an ampoule with a head portion, closed by fusing after charging a liquid agent in the ampoule, which has an incongruous shape to a predetermined standard, that is, a defectively fused ampoule.

BACKGROUND OF THE INVENTION

Figure 1:
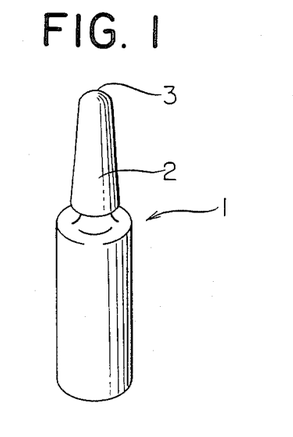
FIG. 1 is a perspective view of an ampoule to be checked in accordance with the invention.
Figure 2:
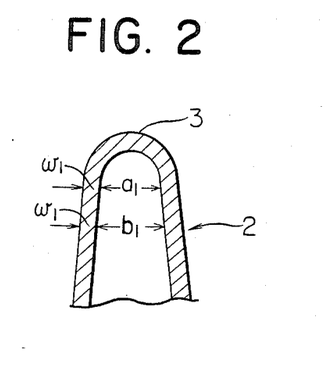
FIG. 2 is an enlarged longitudinal sectional front view showing a head portion of a good ampoule.

Generally, an ampoule 1 as shown in FIG. 1 has a head portion 2 whose top end 3 is opened before charging a liquid agent in the ampoule. After the liquid agent has been charged in the ampoule through the opening, the top end 3 is heated to close the opening by fusing. The thus fused head portion 2 normally has, as shown in FIG. 2, a cavity which gradually enlarges by having a smaller upper diameter a1 than a lower diameter b1, but the entire head portion has a glass wall of a thickness w1 which is substantially uniform. In external appearance, the top end 3 contours a smoothly curved surface and merges into a lower wall contouring a smoothly inclined surface.

However, depending on conditions of a burner flame used for fusing, there result various types of defective products. In an example shown in FIG. 3A. a head portion has a cavity which has a larger upper diameter a2 than a lower diameter b2 and a non-uniform glass wall as defined by different thicknesses w2 and w3 where w2<w3, and an external appearance specified by an expanded top end 3'. In another example as shown in FIG. 3B, a top end 3' is flattened. Conversely, in still another example as shown in FIG. 3C, a top end 3' is sharpened. In a head portion as exemplified in FIG. 3D, a top end 3' droops.

The ampoule 1 having the top end 3 shown in FIG. 2 faces no problem of quality insurance and besides, has an excellent external appearance, thus being handled as a good product which does not disturb normal use. However, when taking the product of FIG. 3A among the defective products of FIGS. 3A to 3D, for instance, this product is liable to breakage because of a thin wall region of the thickness w2, having difficulties with quality insurance and is degraded in external appearance. Therefore, this defective product should be put in disposal. For checking whether the thickness and the external form of products are acceptable or not, a standard is set up.

Ampoules with fused head portions must be examined one by one as to whether they have thicknesses or external forms which conform to the standard, in order to detect defective products. Conventionally, to this end, an inspector holds by hand each ampoule in front of a white board and light is irradiated on the ampoule in order for the inspector to check with the eye an image projecting on the white board.

This checking method has been valid for detecting a product with a largely deformed head portion but disadvantageously, has almost been invalid for detecting a small deformation and consequently failed to accurately detect defective ampoules. In addition, detection efficiency of this method has been very poor.

SUMMARY OF THE INVENTION

An object of this invention is to obviate the drawbacks of the conventional checking method and to provide a method of and an apparatus for checking defectively fused ampoules with high accuracies and at high speeds.

According to the invention, the above object can be accomplished by a method of checking defectively fused ampoules comprising the steps of projecting a head portion of a fused ampoule on a light receiving screen so as to focus an image of the head portion hereon, scanning a focused image with a plurality of scanning lines running in the diametral direction of the focused image and sequentially sweeping in the longitudinal direction thereof to produce a plurality of edge signals corresponding to the scanning lines, measuring from each of the edge signals the number of edge segments and the inner and outer widths, comparing measured values with predetermined logical references set for the number of edge segments and inner and outer widths, and judging the fused ampoule to be defective when the measured values are incongruous to the logical references.

The above object can also be accomplished by an apparatus for checking defectively fused ampoule comprising projecting means for forming a focused image of a head portion of a fused ampoule, and judging means for judging, on the basis of the focused image, whether the wall thickness and the external form of the ampoule conform to predetermined standards, wherein the judging means includes means for scanning the focused image with a plurality of scanning lines running in the diametral direction of the focused image and sequentially sweeping in the longitudinal direction thereof, edge signal producing circuit means, responsive to the plurality of scanning lines, for producing a plurality of edge signals corresponding to the scanning lines, means for measuring from each of the edge signals the number of edge segments, an edge number judging circuit receiving the number of edge segments and comparing the number of edge segments with a predetermined edge number logical reference to produce a defect signal when the number of edge segments is incongruous to the edge number logical reference, means for measuring from each of the edge signals the inner and outer widths, and an edge width judging circuit receiving the inner and outer widths and comparing the inner and outer widths with predetermined inner and outer width logical references to produce a defect signal when the inner and outer widths are incongruous to the inner and outer width logical references.

DESCRIPTION OF THE PREFERRED EMBODIMENT

Figure 4:
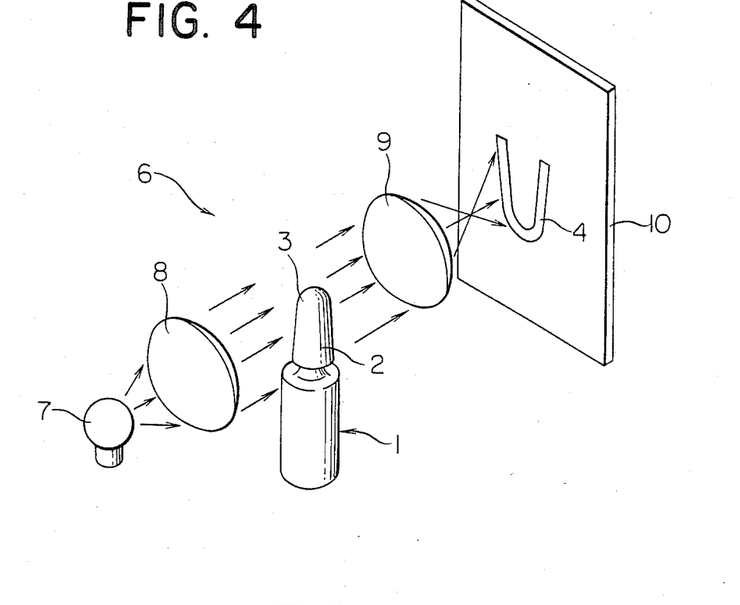
FIG. 4 is a schematic perspective view showing a projecting means of an apparatus for checking defectively fused ampoules according to the invention.

Referring now to FIG. 4, there is illustrated a projecting means 6 of an apparatus for checking defectively fused ampoules according to the invention. The projecting means comprises a lamp 7, a projecting lens 8, a focusing lens 9 and a light receiving screen 10 of a television camera. When an ampoule image 4 is to be focused on the light receiving screen 10, a head portion 2 with a top end 3 of an ampoule 1 is placed between the two lenses 8 and 9 and light emitting from the lamp 7 is irradiated on the head portion 2.

Figure 5:
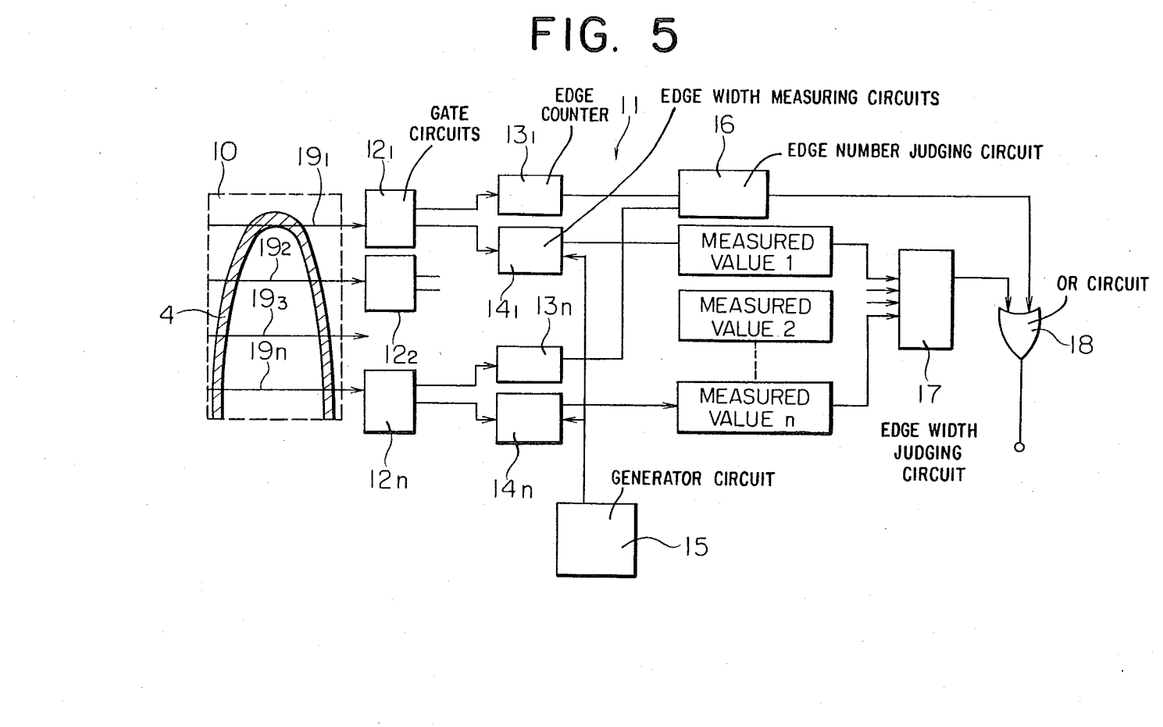
FIG. 5 is a block diagram of a judging means of the defectively fused ampoule checking apparatus according to the invention.

FIG. 5 shows, in block form, a circuit of a judging means used for checking defectively fused ampoules in accordance with the present invention. Referring to FIG. 5, a plurality of gate circuits $12_1$ to $12_n$ are arranged in the longitudinal direction of the ampoule image 4 focused on the light receiving screen 10 and respectively respond to a number of scanning lines $19_1$ to $19_n$ to produce edge signals corresponding to the scanning lines. As well known in the art, these scanning lines are generated by the television camera so as to run in the horizontal direction, i.e., in the direction of width of the ampoule image and sequentially sweep at a predetermined interval in the vertical direction, i.e., in the longitudinal direction of the ampoule image. Edge counters $13_1$ to $13_n$ respectively connected to the gate circuits $12_1$ to $12_n$ receive therefrom the edge signals, count the number of edges, (edge segments to be described later), and deliver out signals (digital) indicative of counts.

To detect an interval between adjacent edge segments (hereinafter referred to as edge width) from the edge signals, edge width measuring circuits $14_1$ to $14_n$ are also connected to the gate circuits $12_1$ to $12_n$, respectively. The edge width measuring circuits receive the edge signals from the gate circuits, and measure an inner width between innermost edge segments and an outer width between outermost edge segments. Connected to the circuits $14_1$ to $14_n$ is a generator circuit 15 which generates a reference pulse (clock pulse) for edge width measurement. Signals (analog) representative of the measured edge widths are counted by the clock pulse fed from the generator circuit 15 to the circuits $14_1$ to $14_n$, and signals (digital) indicative of counts are delivered out of the circuits $14_1$ to $14_n$ to provide measured values 1, 2, ... n.

An edge number judging circuit 16 is connected to the edge counters $13_1$ to $13_n$, and an edge width judging circuit 17 is connected to the edge width measuring circuits $14_1$ to $14_n$. Each of the judging circuits 16 and 17 is preset with a logical reference (algorithm) concerning the inputeedge number signal or the input edge width signal, and as will be detailed later, the input edge number signal or the input edge width signal is compared with the logical reference so that a defect signal is delivered out only when the input signal is incongruous to the logical reference.

An OR circuit 18 connected to the two judging circuits 16 and 17 sends a defect signal from the judging circuit 16 and/or 17 to a display unit not shown.

Figure 6:
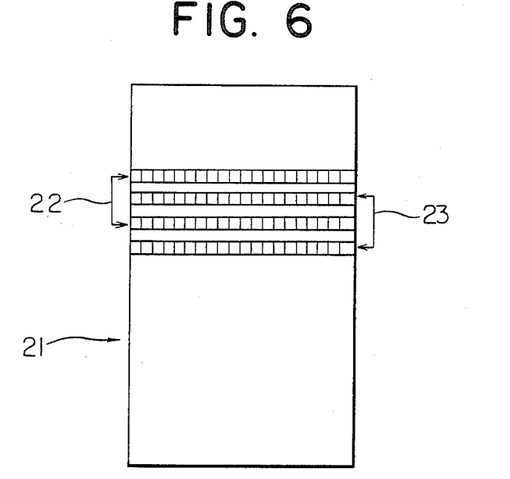
FIG. 6 is a front view of a line sensor used for the defectively fused ampoule checking apparatus according to the invention.

FIG. 6 shows a different light receiving screen from the screen 10 which is formed of a line sensor 21 including sensors 22 and 23. This line sensor 21 is applicable to different sizes of ampoules by using the sensor 22 for ampoules of smaller size and the sensor 23 for ampoules of larger size.

It will be noted that levels of the scanning lines $19_1$ to $19_n$ on the television screen 10 or amounts of light received by the line sensor 21 are decreased at the wall of the ampoule to provide the edge signals, and that the inner width corresponds to the inner diameter of the head portion 2 of ampoule 1 and the outer width corresponds to the outer diameter thereof.

When checking the ampoule with the apparatus described above, an ampoule 1 is projected by the projecting means 6 shown in FIG. 4 on the screen 10 to form an ampoule image 4 focused thereon, and the ampoule image 4 is judged by the judging means 11 shown in FIG. 5.

Figure 7A:
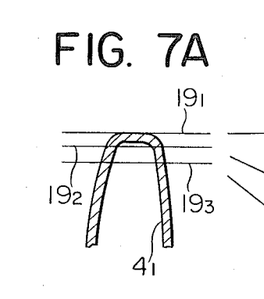
FIG. 7A is a sectional view showing a state wherein an ampoule image of a good ampoule is scanned with scanning lines.
Figure 7B:
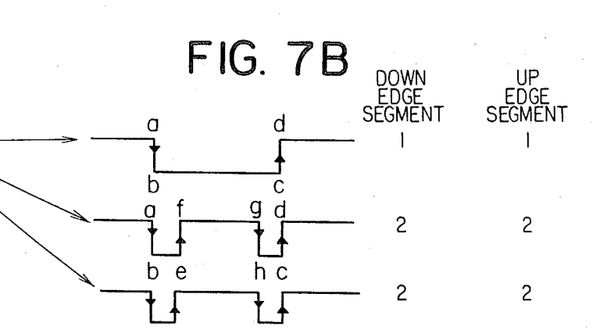
FIG. 7B is a waveform diagram showing edge signals generated corresponding to the scanning lines shown in FIG. 7A.

Firstly, in checking ampoules by means of the edge counters $13_1$ to $13_n$, an ampoule image $4_1$ (FIG. 7A) representative of a good ampoule as shown in FIG. 2 is scanned with the scanning lines $19_1$ to $19_3$ (for simplicity of explanation, only three scanning lines will be considered herein), the gate circuits $12_1$ to $12_3$ produce edge signals corresponding to the scanning lines $19_1$ to $19_3$, and the edge counters $13_1$ to $13_3$ count the edge signals to provide the number of edges, especially, the number of edge segments to be detailed below. The edges signals take waveforms as shown in FIG. 7B and are counted as also shown in FIG. 7B. More particularly, the scanning line $19_1$ associated with a tip of the ampoule is modulated to provide a down edge segment signal a-b at an entrance to the ampoule image $4_1$ and an up edge segment signal c-d at an exit from the ampoule image $4_1$, indicating that two edge segments are counted. The sequential scanning lines $19_2$ and $19_3$ are modulated to provide, in addition to the above edge segment signals a-b and c-d, an up edge segment signal e-f and a down edge segment signal g-h. Accordingly, for the good or acceptable ampoule, the number of up edge segment signals and the number of down edge segment signals, respectively associated with one scanning line, will no exceed two.

Therefore, this numerical value is set as a logical reference in the edge number judging circuit 16.

Figure 8A:
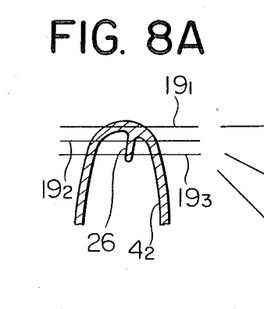
FIG. 8A is a sectional view showing a state wherein an ampoule image of a defective ampoule is scanned with the scanning lines.
Figure 8B:
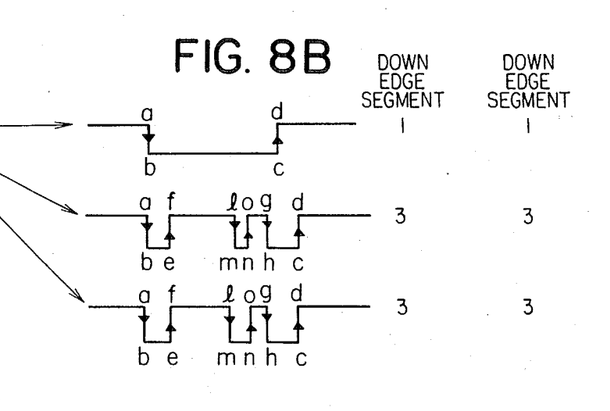
FIG. 8B is a waveform diagram showing edge signals generated corresponding to the scanning lines shown in FIG. 8A.

When a defective ampoule image $4_2$ as shown in FIG. 8A is scanned with the scanning lines $19_1$ to $19_3$, edge signals as shown in FIG. 8B are produced. As will be seen from waveforms in FIG. 8B representative of these edge signals, the ampoule image $4_2$ includes a projection image 26 due to a projection formed inside a top end of the ampoule and the scanning lines $19_2$ and $19_3$ associated with the projection image 26 are respectivly modulated to additionally provide a down edge segment signal l-m and an up edge segment signal o-n. Consequently, three down edge segment signals in all and three up edge segment signals in all are inputted to the edge number judging circuit 16.

The judging circuit 16 compares the thus inputted edge number with the logical reference and sends a defect signal indicative of inconformity or incongruity to the OR circuit 18 which in turn sends the defect signal to the display unit.

Figure 3A:
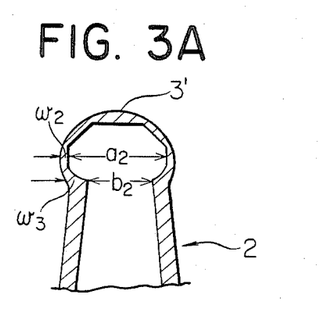
FIG. 3A is a similar sectional view to FIG. 2 showing an example of a defective ampoule head portion.
Figure 3B:
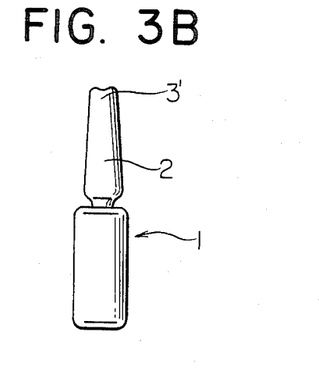
FIGS. 3B, 3C, and 3D are front views showing typical examples of defective ampoules with differently shaped head portions.
Figure 3C:
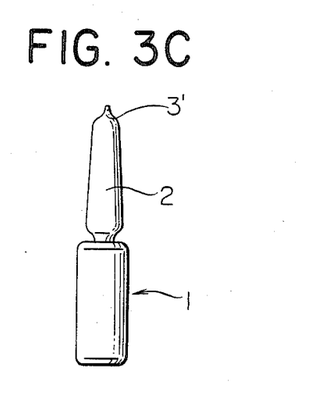
Figure 3D:
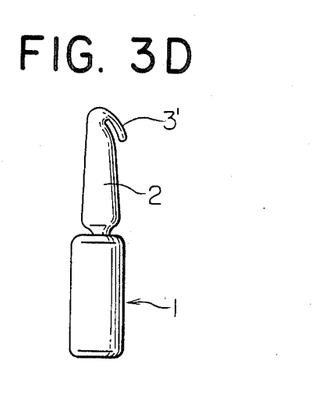
Figure 9A:
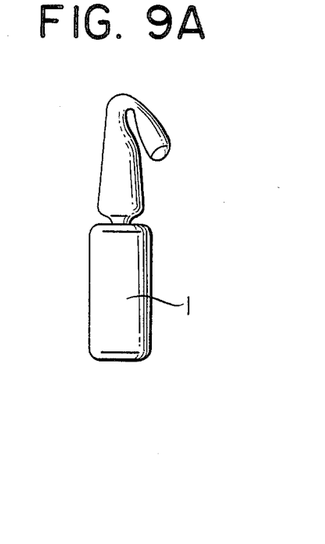
FIGS. 9A and 9B are front views of other types of defective ampoules to be checked in a manner as illustrated in the preceding figures.
Figure 9B:
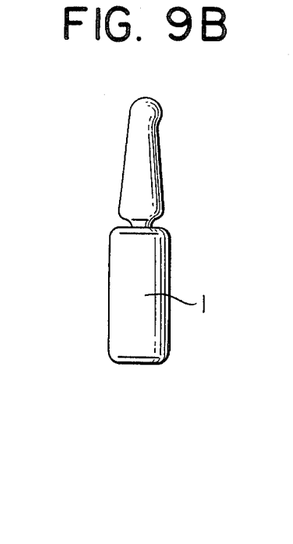

Another type of defective ampoule to be checked in this manner includes an ampoule having a top end which droops as shown in FIG. 3D, 9A or 9B. Such a defective ampoule will not correctly be checked if the defective drooping top end is not positioned properly relative to the screen or sensor. In such an event, it is recommended that the ampoule 1 be measured twice by rotating it about the vertical axis.

Figure 10A:
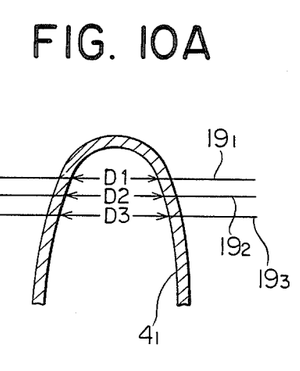
FIG. 10A is a sectional view showing measurement results of the inner width obtained when the ampoule image of the good ampoule in scanned with the scanning lines.

In addition to the checking process described previously, the edge width judging circuits $14_1$ to $14_n$ participate in checking defective ampoules to complete checking in accordance with the present invention. More particularly, an ampoule image $4_1$ of a good ampoule as shown in FIG. 10A is scanned with the scanning lines $19_1$ to $19_3$, and inner and outer widths are measured by the edge width measuring circuits $14_1$ to $14_3$ from edge signals, corresponding to the scanning lines $19_1$ to $19_3$, which are delevered out of the gate circuits $12_1$ to $12_3$. Excepting the defective examples of FIGS. 3D, 8A, 9A and 9B which can be checked by counting the number of edge segments, in the ampoule images shown in, for example, FIGS. 2 and 3A which, when scanned with the scanning line, provide two or less of up edge segments and down edge segments, the inner width is checked which is defined by a distance between innermost edge segments and the outer width is checked which is defined by a distance between outermost edge segments. In an instance of FIG. 10A, the ampoule image $4_1$ is measured to provide inner widths $D_1$ to $D_3$ associated with the scanning lines $19_1$ to $19_3$ which are related to each other by $D_1 < D_2 \leq D_3$. Signals (analog) indicative of the inner widths are counted by the reference clock pulse fed from the reference pulse generator circuit 15 and resulting counts are supplied to the edge width judging circuit 17.

The above relation is set as a logical reference in the edge width judging circuit 17.

Figure 10B:
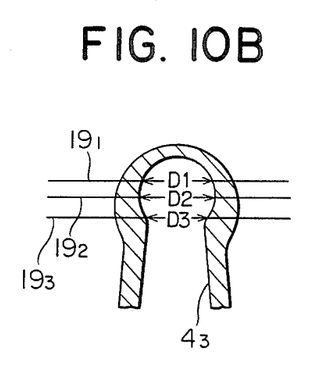
FIG. 10B is a sectional view showing similar measurement results to FIG. 10A obtained when the ampoule image of the defective ampoule is scanned with the scanning lines.

Next, a defective ampoule image $4_3$ as shown in FIG. 10B is scanned with the scanning lines $19_1$ to $19_3$, and inner widths $D_1$ to $D_3$ are measured from edge signals corresponding to the scanning lines $19_1$ to $19_3$. In this example, the thus measured inner widths $D_1$ to $D_3$ are related to each other by $D_1 < D_2 > D_3$. These measured values are compared at the judging circuit 17 with the logical reference and a defect signal indicative of inconformity is delivered to the OR circuit 18.

In this manner, the defective ampoule having the expanded top end as show in FIG. 3A can be checked. Other types of defective ampoules can be checked by detecting the outer width, as will be described below.

Figures 11A, 11B:
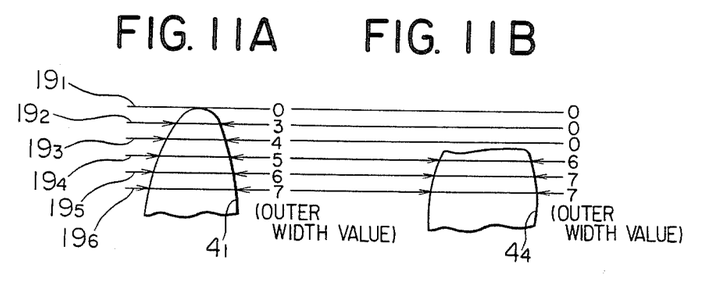
FIG. 11A is a diagram showing measurement results of the outer width obtained when a head portion image of the good ampoule is scanned with the scanning lines.
FIG. 11B, 11C, and 11D are diagrams showing measurement result obtained for ampoule images of differently shaped defective ampoule head portions in a similar manner to FIG. 11A.

In an ampoule image $4_1$ of a good ampoule as shown in FIG. 11A, the first one $19_1$ of the scanning lines $19_1$ to $19_6$ will not be modulated, but the ensuing scanning lines $19_2$ to $19_6$ are modulated and values of outer widths associated with the scanning lines $19_2$ to $19_6$ can be obtained. These values are respectively set to be 3, 4, 5, 6 and 7 in the order of the scanning lines. It is not until the effective fifth scanning line $19_6$ that the outer width reaches a saturation value of 7. Thus, these values are set as logical references.

In an ampoule image $4_4$ as shown in FIG. 11B, three scanning lines $19_4$ to $19_6$ are modulated and outer width values 6, 7 and 7 are obtained. Since, pursuant to the logical references, the saturation value occurs near the fifth scanning line, this ampoule image $4_4$ which provides the saturation value at the second effective scanning line is judged defective.

Figure 11C:
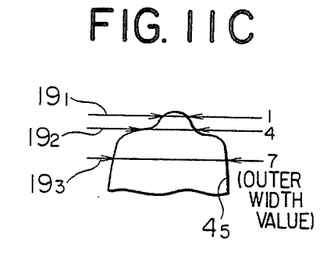
Figure 11D:
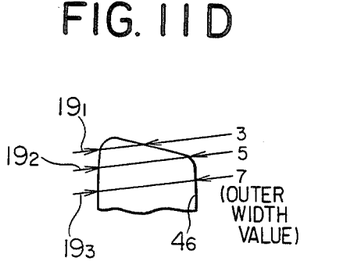

In the same manner, ampoule images $4_5$ and $4_6$ as shown in FIGS. 11C and 11D are judged defective. Specifically, in these examples, the saturation value 7 occurs at the third scanning line.

Figure 12A:
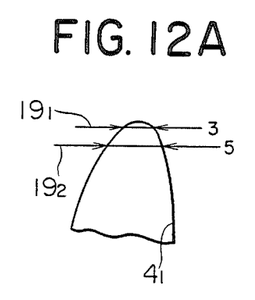
FIG. 12A is a diagram showing measurement results of the outer width obtained when an ampoule top end image of the good ampoule is scanned with the scanning lines.
Figure 12B:
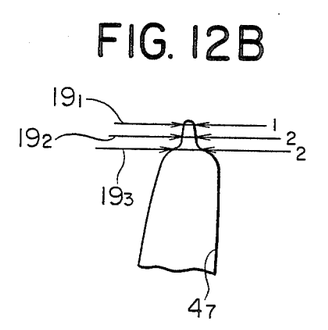
FIG. 12B is a diagram showing measurement results obtained for an ampoule top end image of a defective ampoule in a similar manner to FIG. 12A.

The defective ampoule having the sharpened top end shown in FIG. 3C can be checked as will be described with reference to FIGS. 12A and 12B. In an ampoule image $4_1$ of a good ampoule as shown in FIG. 12A, the first and second scanning lines $19_1$ and $19_2$ are modulated and values of outer widths associated with these scanning lines can be obtained. These values are 3 and 5 and set as logical references. Thus, when comparing a defective ampoule image $4_7$ as shown in FIG. 12B with the logical references, the scanning lines $19_1$ to $19_3$ for the ampoule image $4_7$ are modulated to provide outer width values 1, 2 and 2 which are all smaller than the logical references. In addition, identical outer width value 2 is obtained for the two scanning lines $19_2$ and $19_3$. Accordingly, an ampoule of this image $4_7$ is judged defective as having the top end which is incongruous to the logical references.

Figure 13:
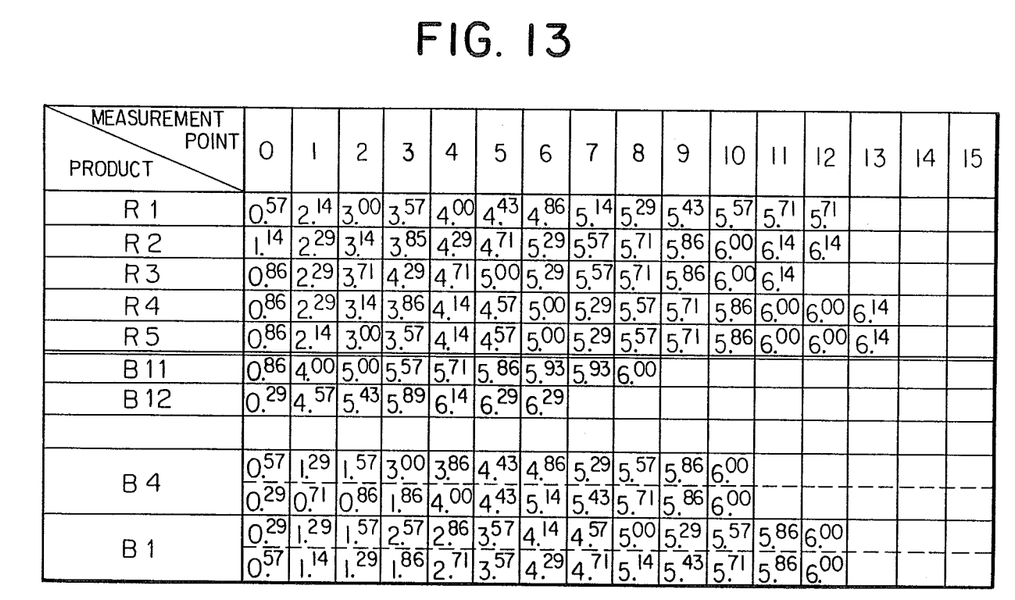
FIG. 13 illustrates check data of various ampoules checked with the checking apparatus according to the invention.
Figure 14:
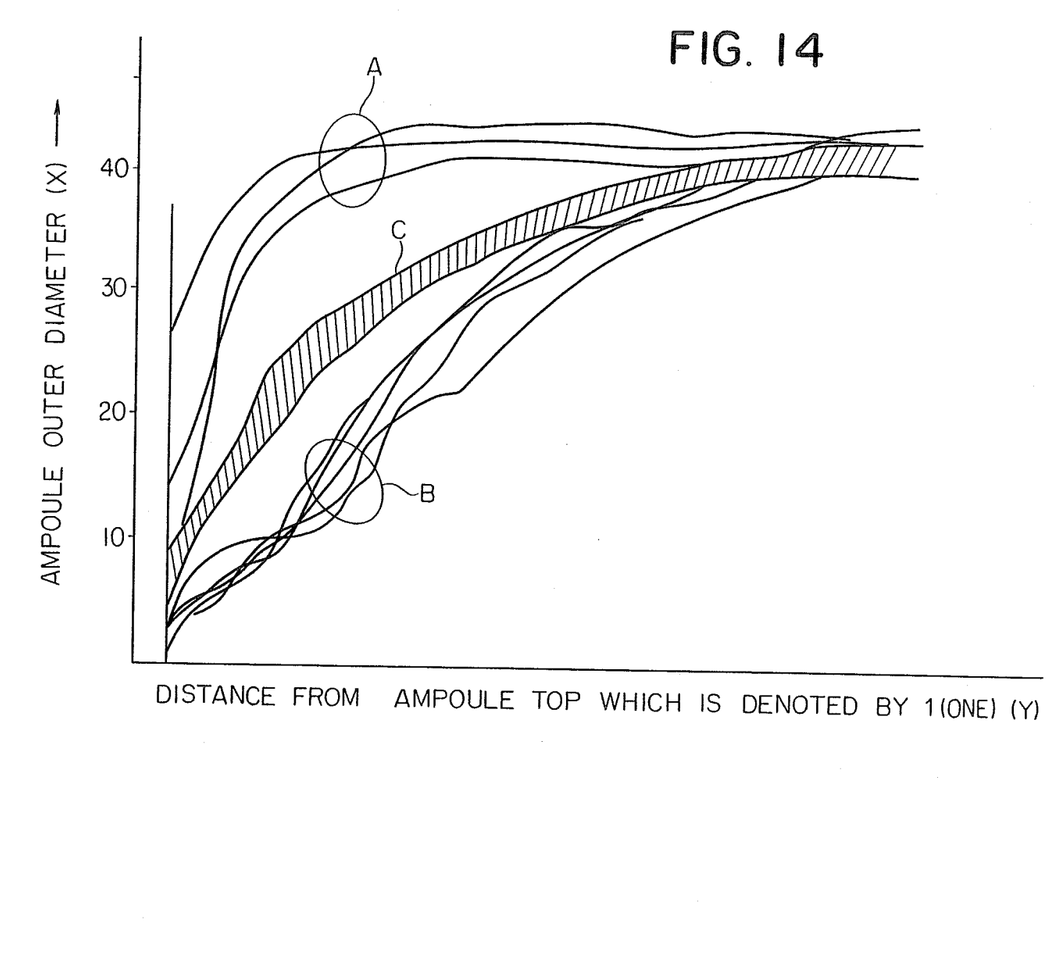
FIG. 14 is a graph illustrative of the data of FIG. 13.

FIG. 13 shows actual detection data for several ampoules checked in accordance with the method of the invention. In this table, acceptable products are designated by R1 to R5 and unacceptable products are designated by B1, B4, B11 and B12. Especially, the defective products B1 and B4 have flattened heads and the defective products B11 and B12 have sharpened heads. Numerical values (mm) denote outer diameters of the checked ampoules. Measurement is carried out at an interval of about 0.3 mm. The data of FIG. 13 is graphically plotted in a graph of FIG. 14 where abscissa represents distance from the ampoule top which is denotd by 1 (one), and ordinate represents the outer diameter of the ampoule. The defective products B1 and B4 having the sharpened heads are twice measured by rotating them at 90° angular interval to obtain the illustrated data. In the graph of FIG. 14, the defective products having the feat heads are grouped into A, the defective products having the sharpened heads are grouped into B and the acceptable or good products are grouped into C. Measured values of the good products all fall within a hatched region.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A method of checking defectively fused ampoules comprising the steps of:
   projecting a head portion of a fused ampoule on a light receiving screen so as to focus an image of the head portion thereof;
   scanning the focused image with a plurality of scanning lines running in the diametral direction of said focused image and sequentially sweeping the longitudinal direction thereof, to produce a plurality of edge signals corresponding to the scanning lines;
   measuring from each of the edge signals the number of edge segments and the inner width between innermost edge segments and outer width between outermost edge segments;
   comparing measured values with predetermined logical references set for the number of edge segments and limits on the said inner and outer widths; and
   judging said fused ampoule to be defective when the measured values are outside of said limits of the logical references.

2. An apparatus for checking defectively fused ampoules comprising:
   projecting means for forming a focused image of a head portion of a fused ampoule;
   judging means for judging, on the basis of the focused image, whether the wall thickness and the external form of said ampoule conform to predetermined standards,
   Said judging means including: means for scanning the focused image with a plurality of scanning lines running in the diametral direction of said focused image and sequentially sweeping in the longitudinal direction thereof;
   edge signal producing circuit means, responsive to the plurality of scanning lines, for producing a plurality of edge signals corresponding to the scanning lines;
   means for measuring from each of the edge signals the number of edge segments;
   an edge number judging circuit receiving the number of edge segments and comparing the number of edge segments with a predetermined edge number logical reference, to produce a defect signal when the number of edge segments is incongruous to the edge number logical reference;
   means for measuring from each of the edge signals the inner widths between innermost edge segments and outer widths between outermost edge segments;
   an edge width judging circuit receiving the said measured inner and outer widths and comparing the measured inner and outer widths with predetermined limits for the said inner and outer width logical references, to produce a defect signal when the said measured inner and outer widths are outside of said limits of the said inner and outer widths logical references.

* * * * *